United States Patent [19]
Bothwell

[11] 4,205,420
[45] Jun. 3, 1980

[54] PROCESS FOR MAKING A BENT METAL TUBE HAVING A METAL-CERAMIC LINER

[75] Inventor: Bruce E. Bothwell, Walchwil, Switzerland

[73] Assignee: Repwell Associates, Inc., Bloomfield Hills, Mich.

[21] Appl. No.: 889,065

[22] Filed: Mar. 22, 1978

[51] Int. Cl.² .................... B23P 15/00; B29D 23/00
[52] U.S. Cl. .................... 29/157 R; 29/445; 29/527.2; 138/145; 264/269; 264/295
[58] Field of Search ............. 29/157 R, 445, 527.1, 29/527.2; 138/145, 149; 264/269, 270, 295, 339; 181/282; 428/629–633

[56] References Cited
U.S. PATENT DOCUMENTS

| | | | |
|---|---|---|---|
| 1,892,433 | 12/1932 | Huff | 138/145 |
| 2,614,058 | 10/1952 | Francis | 138/145 |
| 2,962,051 | 11/1960 | Burkes, Jr. | 138/149 |
| 3,060,069 | 10/1962 | Sindars | 29/445 |
| 3,289,703 | 12/1966 | Brown | 138/149 |
| 3,401,442 | 9/1968 | Matheny | 29/527.2 |

*Primary Examiner*—Daniel C. Crane

*Attorney, Agent, or Firm*—Reising, Ethington, Barnard, Perry & Brooks

[57] ABSTRACT

A process is disclosed for making a bent metal tube having a metal-ceramic liner for thermally and acoustically insulating the tube. A generally straight metal tube is first lined with a metal grid before bending the tube to a desired shape. Heating of the grid and a ceramic slurry coated thereon forms the slurry into a monolithic ceramic body with the metal grid embedded therein so that the resultant liner provides a durable thermal and acoustic insulation for the tube. Insulated tubes for internal combustion engine exhaust systems are advantageously made by this process with the liner positioned within the tube to provide heat conservation, lower under-hood temperatures, lower noise, and longer tube life as well as allowing the use of lower grade and lighter gauge metal for the tube. The ceramic slurry is disclosed as being coated on the grid before the grid is inserted into the tube, after the insertion but before the bending, or after the insertion and the bending. The slurry can also be air or heat dried to a semi-viscous condition and still thermally and acoustically insulate the tube.

7 Claims, 5 Drawing Figures

PROCESS FOR MAKING A BENT METAL TUBE HAVING A METAL-CERAMIC LINER

TECHNICAL FIELD

This invention relates generally to a process for making a bent metal tube having a metal-ceramic liner for thermally insulating the tube, and more specifically relates to such a process for making a thermally and acoustically insulated tube for an internal combustion engine exhaust system.

My prior U.S. Pat. No. 4,059,712, which is hereby incorporated by reference, discloses a high temperature insulation of a metal-ceramic composite. This insulation is made by coating a metal grid with a ceramic slurry and then heating the layer of ceramic and the grid therein to provide a monolithic ceramic body having an embedded grid.

BACKGROUND ART

There are many uses for thermally insulated metal tubes. For example, internal combustion engine exhaust systems having catalytic converters operate more efficiently when the exhaust gases fed to the converter are at a relatively high temperature. The engine exhaust pipe or tube between the exhaust manifold and the coverter thus is preferably insulated to maintain the exhaust gas temperatures sufficiently high to provide the higher efficiency of the converter. Ceramics have a relatively low thermal conductivity and high temperature resistance and would appear to provide a good material for such a usage. However, ceramics have a considerably different coefficient of thermal expansion than metals and are relatively brittle so that the ceramic would break or crack if used for such a purpose. If the ceramic were used in a fibrous structure rather than a monolithic structure, the fibers would not be sufficiently strong to withstand the high velocity and the pulsating action of exhaust gases moving through the tube. Also, another problem with manufacturing exhaust tubes for use with internal combustion engines is that these tubes are not straight and the bent shape thereof makes it relatively difficult to line the tube. It is also desirable for such tubes to provide noise insulation.

DISCLOSURE OF THE INVENTION

An object of the present invention is to provide an improved process for making a bent metal tube having a metal-ceramic liner for thermally and acoustically insulating the tube, and another object is to provide such a process that may advantageously be utilized to make an insulated tube for use with the exhaust sustem of an internal combustion engine.

In carrying out the above objects, a generally straight metal tube is lined with a metal grid before bending the tube to a desired shape. Heating of the grid and a ceramic slurry coated thereon forms the slurry into a monolithic ceramic body with the metal grid embedded therein such that the liner thermally and acoustically insulates the tube. Preferably, the liner is positioned within the tube for best performance. The ceramic slurry is coated on the grid before the grid is inserted into the tube, after the insertion but before the bending, or after the insertion and the bending. The slurry is air dried or heat dried at a relatively low temperature to a semi-viscous condition before the final heating that fires the ceramic. It is also possible to use the tube with the semi-viscous ceramic and still obtain the thermal and acoustical insulation properties to a somewhat lesser extent.

The process for making the insulated tube is advantageously utilized for the exhaust tube of an internal combustion engine. The ceramic grid liner is positioned within the interior of the tube so as to maintain a relatively high temperature of the exhaust gases. Connection of the exhaust tube to a catalytic converter then maintains the temperature of the exhaust gases delivered through the tube high enough so that the converter can operate more efficiently than with an unlined metal tube. Also, depending on the ceramic utilized, the heating of the ceramic slurry and the grid can in part be performed by the exhaust gases when the exhaust tube is initially used with an engine.

The objects, features, and advantages of the present invention are readily apparent from the following description of the best mode for carrying out the invention when taken in connection with the accompanying drawings.

BEST MODE FOR CARRYING OUT THE INVENTION

Figure 1:
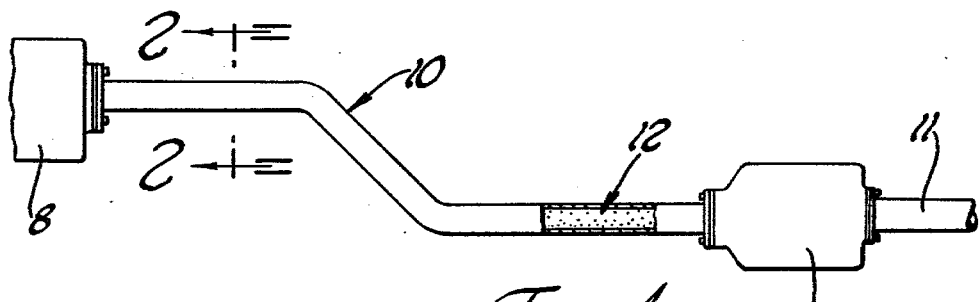
FIG. 1 is a partially broken away view of an insulated exhaust tube made in accordance with the process of the present invention and used in an internal combustion exhaust system.

Referring to FIG. 1 of the drawings, a bent steel pipe or tube made by the process of this invention is indicated generally by reference numeral 10 and has opposite ends which are flanged and respectively connected in a suitable manner to an internal combustion engine exhaust manifold 8 and to a catalytic converter 9 from which an exhaust pipe 11 extends. Tube 10 includes a metal-ceramic liner 12 that thermally and acoustically insulates the tube between the exhaust manifold and the catalytic converter. More efficient converter operation is possible than with an unlined tube due to the higher temperature of gas fed to the converter. While the insulated tube is specifically designed for use with an engine exhaust system as shown, other uses for the insulated tube are self-evident. Thinner gauge metal of a lower grade can be used for the tube 10 due to the provision of the liner 12, e.g. mild steel can be used instead of stainless steel to provide significant cost reduction. Lower under-hood temperatures and lower noise levels are other advantages achieved by use of this insulated tube.

Figure 2:
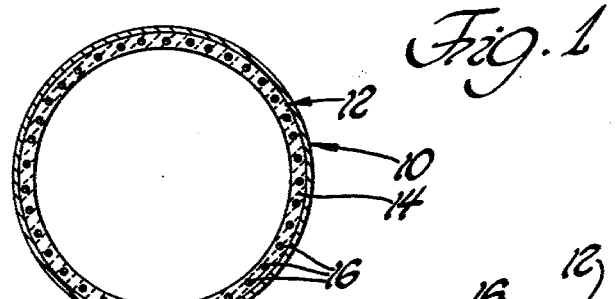
FIG. 2 is a sectional view taken along line 2—2 of FIG. 1.

As seen in FIG. 2, the liner 12 is located within the interior of the tube 10 and includes a monolithic ceramic body 14 having a metal grid 16 embedded within the body. Grid 16 may be made from wire mesh, expanded metal lath, or sheet metal with openings punched therethrough, etc.

Figure 3:
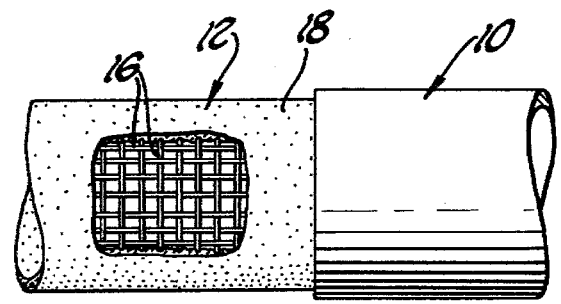
FIG. 3 is a partially broken away view which shows the tube as it is being made by inserting a metal grid with a ceramic slurry coated thereon within the tube to provide a liner.

Referring to FIG. 3, the completed tube is made one way starting with a generally straight metal tube 10 into which a liner 12 having a ceramic slurry covered grid 16 is inserted. The grid 16 has a round cylindrical shape and the ceramic slurry 18 is coated on the grid to fill the grid openings. Specific examples of the types of tubes, grids and materials thereof, and the ceramic slurries which may be utilized are disclosed in the aforementioned U.S. Pat. No. 4,059,712 which has been herein incorporated by reference.

Figure 4:
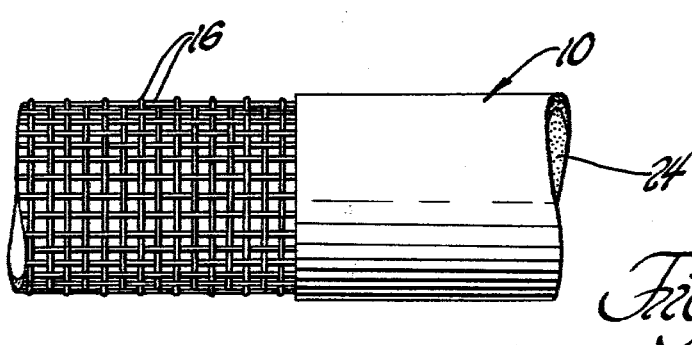
FIG. 4 is a view similar to FIG. 3 but illustrates another way the insulated tube can be made by inserting the grid into the tube prior to coating the grid by the slurry either before or after bending of the tube.
Figure 5:
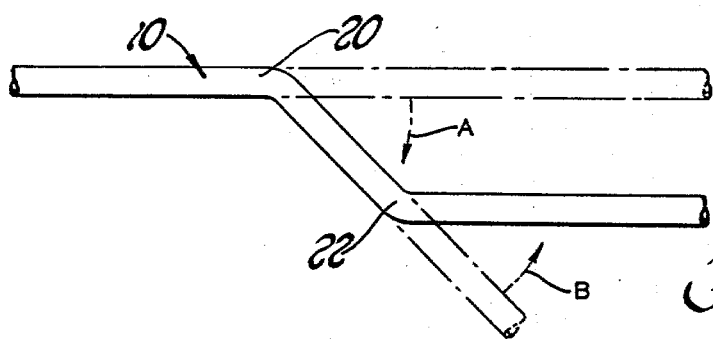
FIG. 5 is a view which shows the manner in which the tube is bent prior to a final heating step that forms the ceramic slurry into a monolithic ceramic body having the grid embedded therein to insulate the tube.

Another way the tube can be made is illustrated in FIG. 4 which shows the uncoated grid 16 being inserted into tube 10. The inserted grid 16 is coated with the ceramic slurry in any suitable manner before or after the bending operation which is performed on the tube.

Bending of the tube 10 and the coated or uncoated grid therein is performed by any conventional tube bending process. As shown in FIG. 4, the tube is bent from its straight shape along the direction of arrow A to provide one bend 20 and is then bent along the direction of arrow B to provide a second bend 22. The flexible nature of the metal grid 16 and the viscous or air dried semi-viscous condition of ceramic slurry on the grid allows the bending to take place with liner 12 maintained in a contiguous relationship with the interior side of the metal tube at the bends 20 and 22. Grid 16 will facilitate bending of the tube 10 in that it will tend to provide internal support during bending so as to resist collapsing of the tube wall and also allow the use of thinner tube stock.

After the tube 10 is bent, the ceramic slurry 18 and the grid 16 coated thereby are heated to form the slurry into the monolithic ceramic body 14 with the grid embedded therein. The temperature to which the ceramic must be heated depends upon the particular slurry utilized. As the liner 12 cools, the difference in the coefficient of thermal expansion of the grid 16 and the monolithic ceramic body 14 compresses the ceramic body while the grid is tensioned to provide a prestressed liner of a relatively high strength. Good thermal and acoustical insulation is also provided to the metal tube by a liner made according to this process. In certain cases it may be helpful to apply a nonbonding release agent to the interior of the tube, such as wax 24 shown in the tube 10 at its right end in FIG. 4, so that the ceramic slurry does not bond to the tube and is thus not tensioned or compressed thereby during heating and cooling of the resultant tube due to differences in the coefficients of thermal expansion of the metal and the ceramic.

It should be noted that depending upon the particular ceramic slurry utilized and the temperature thereof at which the monolithic ceramic body is formed, the heating step may in part be performed during the initial use of the tube 10 with an internal combustion engine exhaust system. Exhaust gases flowing through the tube the first time can have sufficient heat with certain slurries to provide firing that forms the monolithic ceramic body 14 within the tube. Also in certain instances, it is possible to air dry the slurry or heat dry it at a relatively low temperature. The ceramic will then be semi-viscous and still provide good thermal and acoustical insulation for the tube.

While the best mode for practicing the tube making process involved has herein been described in detail, those skilled in the art to which it relates will recognize that there are various alternative ways of practicing this invention as described by the following claims.

What is claimed is:

1. A process for making a bent metal tube having a metal-ceramic liner for thermally and acoustically insulating the tube, the process comprising: lining a generally straight metal tube with a grid made completely of metal and having a generally round cylindrical shape positioned adjacent the tube with openings through the grid; bending the tube and metal grid liner thereof so as to deform both the tube and the metal grid liner while the metal grid supports the tube as the bending takes place; coating the grid with a ceramic slurry that fills the openings of the metal grid; and heating the ceramic slurry and grid liner after the tube is bent to form a monolithic ceramic body with the metal grid embedded therein whereby the liner thermally and acoustically insulates the tube.

2. A process for making a thermally and acoustically insulated tube for an internal combustion engine exhaust system, the process comprising: lining the interior of a generally straight metal tube with a grid made completely of metal and having a generally round cylindrical shape positioned adjacent the interior surface of the tube with openings through the grid; bending the tube and grid liner thereof so as to deform both the tube and the metal grid liner while the metal grid supports the interior surface of the tube as the bending takes place; coating the metal grid with a ceramic slurry that fills the openings of the metal grid; and heating the ceramic slurry and grid liner within the bent tube to form a monolithic ceramic body with the grid embedded therein whereby the liner thermally and acoustically insulates the bent tube.

3. A process for making a thermally and acoustically insulated tube for an internal combustion engine exhaust system, the process comprising: lining the interior of a generally straight metal tube with a grid made completely of metal and having a generally round cylindrical shape positioned adjacent the interior surface of the tube with openings through the grid and coated with a ceramic slurry that fills the openings of the metal grid; bending the tube and coated grid liner thereof so as to deform both the tube and the metal grid liner while the metal grid supports the interior surface of the tube as the bending takes place; and heating the ceramic slurry and grid of the liner within the bent tube to form a monolithic ceramic body with the grid embedded therein whereby the liner thermally and acoustically insulates the bent tube.

4. A process for making a thermally and acoustically insulated tube for an internal combustion engine exhaust system, the process comprising: lining the interior of a generally straight metal tube with a grid made completely of metal and having a generally round cylindrical shape positioned adjacent the interior surface of the tube with openings through the grid; coating the metal grid in the tube with a ceramic slurry that fills the openings of the metal grid; bending the tube and coated grid liner therein so as to deform both the tube and the metal grid liner while the metal grid supports the interior surface of the tube as the bending takes place; and heating the ceramic slurry and grid of the liner within the bent tube to form a monolithic ceramic body with the grid embedded therein whereby the liner thermally and acoustically insulates the bent tube.

5. A process for making a thermally and acoustically insulated tube for an internal combustion engine exhaust system, the process comprising: lining the interior of a generally straight metal tube with a grid made completely of metal and having a generally round cylindrical shape positioned adjacent the interior surface of the tube with openings through the grid; bending the tube and grid liner therein so as to deform both the tube and the metal grid liner while the metal grid supports the interior surface of the tube as the bending takes place; coating the metal grid with a ceramic slurry after the bending of the tube so that the ceramic slurry fills the openings of the metal grid; and heating the ceramic slurry and grid of the liner within the bent tube to form a monolithic ceramic body with the grid embodded therein whereby the liner thermally and acoustically insulates the bent tube.

6. A process for making a bent metal tube having a metal-ceramic liner for thermally and acoustically insulating the tube, the process comprising: lining a generally straight metal tube with a grid made completely of metal and having a generally round cylindrical shape positioned adjacent the tube with openings through the grid; bending the tube and metal grid liner thereof so as to deform both the tube and the metal grid liner while the metal grid supports the tube as the bending takes place; coating the grid with a ceramic slurry that fills the openings of the metal grid; and drying the ceramic slurry to semi-viscous condition with the metal grid embedded therein whereby the liner thermally and acoustically insulates the tube.

7. A process for making a thermally and acoustically insulated tube of a bent shape for an internal combustion engine exhaust system, the process comprising: lining the interior of a generally straight metal tube with a grid made completely of metal and having a generally round cylindrical shape positioned adjacent the interior surface of the tube with openings through the grid and coated with a ceramic slurry that fills the openings of the metal grid; and bending the combined tube and coated grid liner thereof to said bent shape so as to deform both the tube and the metal grid liner while the metal grid supports the interior surface of the tube as the bending takes place.

* * * * *

UNITED STATES PATENT AND TRADEMARK OFFICE
CERTIFICATE OF CORRECTION

PATENT NO. : 4,205,420

DATED : June 3, 1980

INVENTOR(S) : Bruce E. Bothwell

It is certified that error appears in the above—identified patent and that said Letters Patent is hereby corrected as shown below:

Column 1, Line 52, (Specification page 2, line 21), "sustem" should be --system--

Column 5, Line 13, (Claim 5), "embodded" should be --embedded--

Signed and Sealed this

Twenty-eighth Day of October 1980

[SEAL]

Attest:

SIDNEY A. DIAMOND

Attesting Officer

Commissioner of Patents and Trademarks